Aug. 28, 1928.
C. H. H. RODANET
1,682,252
ELECTRICAL MEASURING INSTRUMENT
Filed July 25, 1927    2 Sheets-Sheet 1
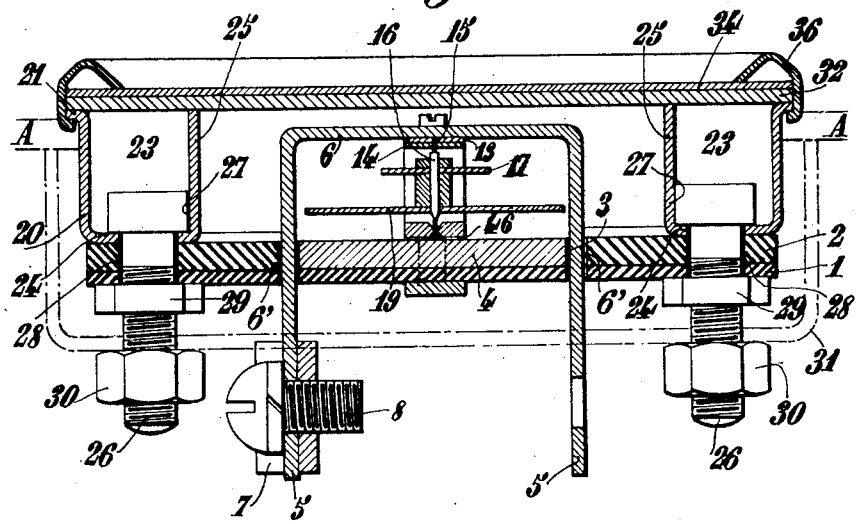
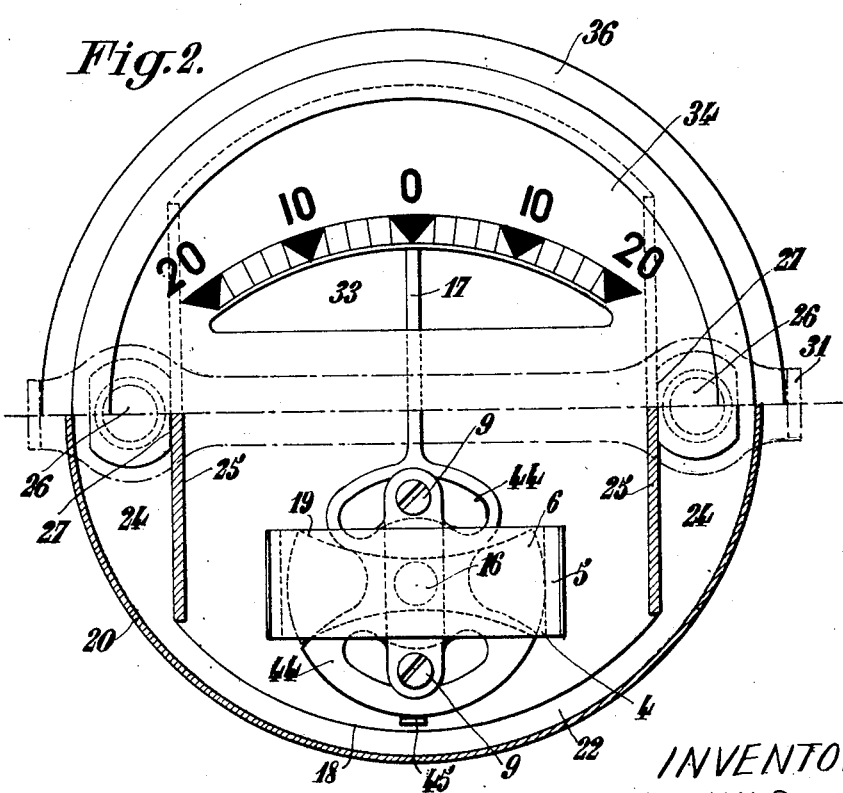
INVENTOR
Charles H.H. Rodanet Aug. 28, 1928.　　　　　　　　　　　　　　1,682,252
C. H. H. RODANET
ELECTRICAL MEASURING INSTRUMENT
Filed July 25, 1927　　　2 Sheets-Sheet 2

INVENTOR
Charles H. H. Rodanet
by
Att'ys.

Patented Aug. 28, 1928.

1,682,252

UNITED STATES PATENT OFFICE.

CHARLES HILAIRE HENRI RODANET, OF VERSAILLES, FRANCE, ASSIGNOR TO SOCIETE ANONYME ETABLISSEMENTS ED. JAEGER, OF LEVALLOIS, FRANCE, A FRENCH COMPANY.

ELECTRICAL MEASURING INSTRUMENT.

Application filed July 25, 1927, Serial No. 208,364, and in France August 2, 1926.

This invention relates to improvements in the manufacture of electrical measuring instruments for motor vehicles and concerns more particularly the construction of ammeters.

According to the invention the conductor through which the current which it is desired to measure passes and which must determine the production of a variable magnetic field, is formed by a piece of metal of U shape the arms of which are connected to the circuit to be checked. The horizontal part or bridge piece connecting the arms of this U is arranged parallel to a permanent magnet consisting of a flat bar; it also constitutes one of the elements of a frame which supports the axis on which are mounted, on the one hand, a movable vane subject to the action of the resulting variations of the magnetic field, and on the other hand the indicating needle. The bridge piece of the U is supported by two vertical pillars the axes of which lie in a plane perpendicular to that of the said bridge piece. The plane of the indicating needle in its resting position also passes through the axes of the supporting pillars of the U, so that this needle should be of special conformation to oscillate, during measuring, around its equilibrium position.

In the accompanying drawings Figs. 1 and 2 are a vertical section and a sectional plan view respectively of an ammeter constructed in accordance with the features of the present invention.

Figure 3:
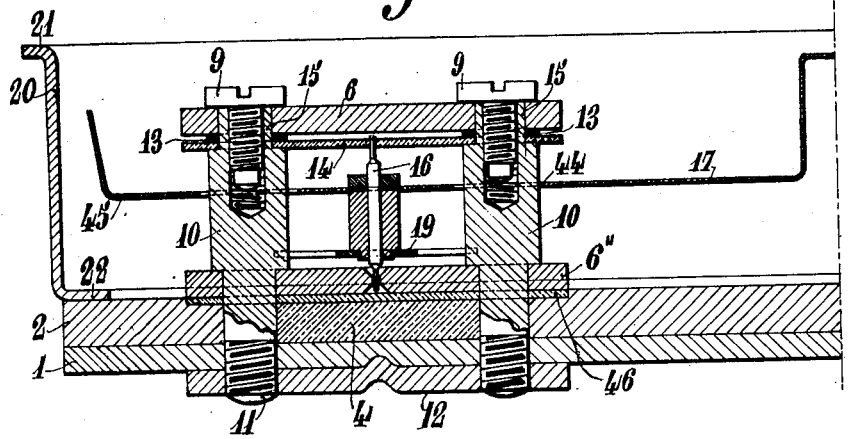
Figure 4:
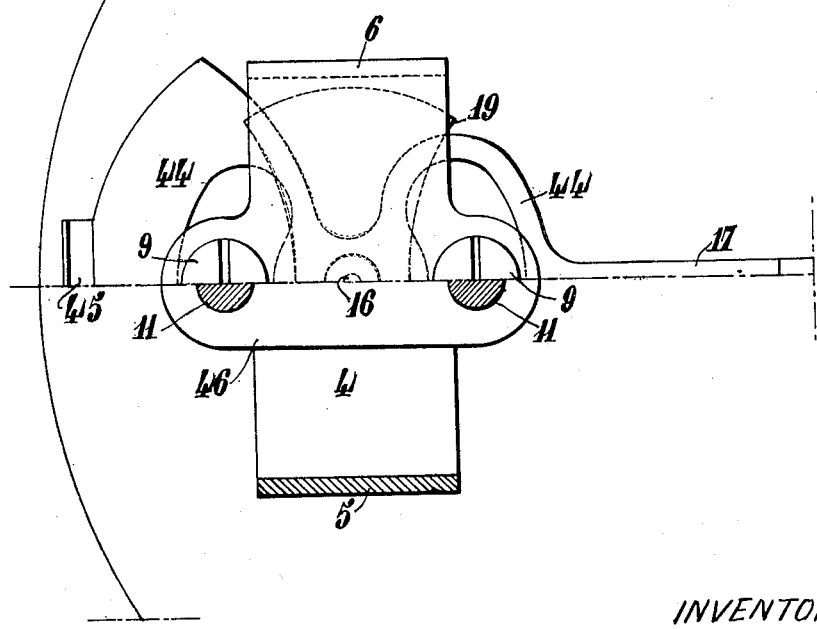

Figs. 3 and 4 are detailed views on a larger scale.

The base of the apparatus is composed of two circular plates 1—2 of insulating material. In the upper plate 2 a rectangular aperture 3 is cut in which a bar magnet 4 is positioned, having the same shape. This magnet 4 is supported by its ends on the parallel arms 5 of a U-shaped member or stirrup 6. The arms 5 of this member 6 pass through slots 6' made in the lower plate 1. On the free ends of these arms 5 U-shaped terminal members such as shown at 7 are fixed by means of a screw 8. The terminal members 7 permit the connection of the apparatus with the circuit which it controls. The horizontal part or bridge piece of the stirrup 6 is raised with respect to the base by means of columns 10 which embrace the magnet 4, and of which the axes are situated in a plane perpendicular to the line of the poles of the bar magnet.

The vertical pillars 10 are fixed at their ends into the base of the apparatus. For this purpose each of the pillars 10 comprises, at its lower end, an elongation 11 of smaller diameter. The elongations 11 pass through a transverse bar 6'' which rests on the plate 2 and forms a stop for the pillars 10. These elongations 11 also pass through the bases 2 and 1 and their threaded ends screw into an outside bar 12. The inside bar 6'' forms a centre bearing for the lower pivot of the shaft 16 of the indicating needle 17. The other pivot engages in an aperture in a cross bar 14. This latter rests on the pillars 10 which are prolonged by a cut-out portion 15 receiving by means of a washer 13 the horizontal portion 6 of the stirrup piece. Each pillar 10 has an axial threaded hole receiving a screw 9 holding the bridge-piece 6 in position.

The indicating needle 17 is of special shape so as to be capable of moving angularly with respect to the pillars 10. For this purpose it is provided with two segmentary slots 44 which embrace respectively the pillars 10. It comprises in addition, opposite its indicating arrow 17, a raised portion 45 the inclination of which may be modified at will with respect to the direction of the axis of oscillation 16. This arrangement permits the perfect equilibrium of the movable parts by displacement of its centre of gravity.

The shaft 16 of the needle 17 bears, in addition to the latter, a paramagnetic armature 19 in the shape of a double sector.

This armature 19, in the resting position of the indicating needle 17, has its axis of symmetry placed perpendicularly to a polar mass 46, of ferro-silicon or soft-iron. This polar mass 46 is formed by a bar which is fixed in position by the lower elongations 11 of the columns 10. It is fixed to the permanent magnet 4, perpendicular to its polar axis and its axis of symmetry coincides with the neutral axis of the latter. This device serves to orientate the lines of force of the magnetic field produced by the permanent magnet 4 and to increase their density around the poles of the latter. It results practically that during its angular movements the armature 19 remains submersed in a substantially constant magnetic field, so that the divisions of the scale in front of which the indicating needle 17 moves may be uniformly spaced.

The whole of the apparatus described is mounted and fixed in a metal casing consisting of a body cut out and stamped. This body consists of a cylindrical lateral wall 20 one end of which is flanged as at 21. The other end also forms a flange 22 and has two lateral strips which are bent inwards to form two segment shaped compartments 23. There are thus formed two segment shaped shoulders 24 and two vertical parallel partitions 25. In the compartments 23 are confined bolt heads 26 each having a face 27 which presses against the corresponding vertical partition 25 to prevent any rotation of the bolt round its axis. These bolts pass through apertures 28 made in the superimposed plates 1—2 which rest on the segment shaped shoulders 24 belonging to the casing. A nut 30 provided on each bolt grips on a stirrup strap 31 enabling the apparatus to be attached to a support (on the dash board of a motor vehicle, for example).

The rim 21 of the casing and the vertical partition 25 support the dial 32 provided with a window 33 permitting the needle 17 to be seen. A sheet of transparent material 34 (for example, celluloid) is fixed on the dial 32. The whole is fixed to the rim 21 of the casing by a detachable frame 36 which engages under the said rim 21.

It is evident that the casing constructed as described may be applied in the construction of apparatus other than ammeters.

What I claim is:—

1. In an ammeter, a metallic stirrup piece, a flat magnet positioned parallel to the bridge portion of the said stirrup piece, a magnetizable vane, a vertical shaft for the said vane, an indicating needle mounted on the said shaft, two vertical pillars fixed in the base of the apparatus to support the stirrup piece, a cross bar engaging the ends of the said pillars placed perpendicularly to the permanent magnet, an aperture in the said cross bar to form a centre bearing with respect to the lower pivot of the indicating needle shaft, and a cross bar connecting the upper ends of the pillars to guide the upper pivot of the said shaft and to form a frame.

2. In an ammeter, a metallic stirrup piece conducting the electric current to be measured, a flat magnet parallel to the bridge portion of the said stirrup piece, a double-sector-shaped vane subject to the action of the magnetic fields, a vertical shaft for the said vane, an indicating needle mounted on the said shaft, two vertical pillars fixed on the base of the apparatus to support the stirrup piece and to form a frame, segmentary apertures in the body of the indicating needle to allow its passage respectively past the said vertical pillars, the said needle having a bent back portion to effect its balance relatively to the shaft supporting it.

3. In an ammeter, a metallic stirrup piece conducting the current to be measured, a flat magnet parallel to the bridge portion of the said stirrup piece, a vane subject to the action of the magnetic fields, a vertical shaft for the said vane, an indicating needle mounted on the said shaft, vertical pillars fixed to the base of the apparatus to support the said stirrup piece and the said shaft, a lower cross bar connecting the said vertical pillars to form a frame and a magnetizable bar placed below the said cross bar positioned perpendicularly to the permanent magnet and maintained by the said vertical pillars.

4. In an ammeter, a metallic stirrup piece conducting the current to be measured, a flat magnet parallel to the bridge portion of the said stirrup piece, a double-sector-shaped vane subject to the action of the magnetic fields, a vertical shaft for the said vane, two vertical pillars fixed on the base of the apparatus to support the stirrup piece and to form a frame, a magnetizable bar placed perpendicularly to the permanent magnet, an indicating needle mounted on the vertical shaft and having segmentary apertures in its body on either side of its pivotal axis and symmetric with respect to the axis of the magnetizable bar and a bent strip at one end of its body, and a stamped out box fitted on the base of the apparatus, and having two parts cut out in the bottom of the said box and bent back to form parallel partitions against which the indicating needle abuts laterally.

In testimony whereof I have signed my name to this specification.

CHARLES HILAIRE HENRI RODANET.